(12) United States Patent
Chiba

(10) Patent No.: US 12,292,301 B2
(45) Date of Patent: *May 6, 2025

(54) VEHICLE SUPPORT SYSTEM AND VEHICLE SUPPORT METHOD FOR MARKER RECOGNITION AND ILLUMINATION ADJUSTMENT

(71) Applicant: TOYOTA JIDOSHA KABUSHIKI KAISHA, Toyota (JP)

(72) Inventor: Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

This patent is subject to a terminal disclaimer.

(21) Appl. No.: 18/092,588

(22) Filed: Jan. 3, 2023

(65) Prior Publication Data

US 2023/0258467 A1 Aug. 17, 2023

(30) Foreign Application Priority Data

Feb. 17, 2022 (JP) .................................. 2022-023295

(51) Int. Cl.
*G01C 21/36* (2006.01)
*B60W 30/06* (2006.01)

(52) U.S. Cl.
CPC ......... *G01C 21/3685* (2013.01); *B60W 30/06* (2013.01); *B60W 2556/45* (2020.02)

(58) Field of Classification Search
CPC ............ B60W 2556/45; B60W 30/06; B60W 2556/40; G01C 21/3602; G01C 21/3685;
(Continued)

(56) References Cited

U.S. PATENT DOCUMENTS 6,079,862 A * 6/2000 Kawashima .......... G01S 3/7864
700/59
2013/0141578 A1 6/2013 Chundrlik, Jr. et al.
(Continued)

FOREIGN PATENT DOCUMENTS

| JP | 2006-031144 A | 2/2006 |
| JP | 2019-098911 A | 6/2019 |
| JP | 2020-034472 A | 3/2020 |

OTHER PUBLICATIONS

U.S. Office Action dated May 8, 2024, issued to U.S. Appl. No. 18/092,585, filed Jan. 3, 2023.
(Continued)

*Primary Examiner* — Omer S Khan
(74) *Attorney, Agent, or Firm* — Dinsmore & Shohl LLP

(57) ABSTRACT

A moving body support system supports a moving body that recognizes a marker arranged in a predetermined area. Based on positions of a plurality of markers arranged in the predetermined area, the moving body support system acquires a position of a target marker being a target to be recognized by the moving body. The moving body support system further acquires information indicating brightness at the position of the target marker. When the brightness at the position of the target marker is less than a threshold, the moving body support system selects, based on positions of one or more lights present in the predetermined area, a target light present at a position capable of illuminating the target marker and increases a light intensity of the target light as compared with a case where the brightness is equal to or greater than the threshold.

13 Claims, 20 Drawing Sheets

(58) Field of Classification Search
CPC .......... G01C 21/3889; G05D 1/0234; G05D 1/0246; G05D 1/0274; G06V 10/141; G06V 10/60; G06V 20/586; Y02B 20/40
See application file for complete search history.

(56) References Cited

U.S. PATENT DOCUMENTS

| | | | |
|---|---|---|---|
| 2014/0239848 A1* | 8/2014 | Bradford | H05B 45/10 |
| | | | 315/307 |
| 2016/0071415 A1 | 3/2016 | Maeda et al. | |
| 2018/0196442 A1* | 7/2018 | Wang | G05D 1/0274 |
| 2020/0074859 A1* | 3/2020 | Eshima | B62D 15/0285 |
| 2020/0207335 A1* | 7/2020 | Oh | G01C 21/26 |
| 2020/0269748 A1* | 8/2020 | Mimura | B60Q 1/245 |
| 2021/0016705 A1* | 1/2021 | Hartisch | G06T 7/70 |
| 2021/0183099 A1 | 6/2021 | Fujii et al. | |
| 2021/0233404 A1* | 7/2021 | Matsuhana | G06V 20/586 |
| 2022/0277163 A1* | 9/2022 | Stenneth | G06T 7/12 |
| 2023/0256959 A1 | 8/2023 | Chiba | |

OTHER PUBLICATIONS

Hiroya Chiba, U.S. Appl. No. 18/092,585, filed Jan. 3, 2023.
Final Office Action dated Sep. 9, 2024, issued to U.S. Appl. No. 18/092,585.
Notice of Allowance dated Feb. 12, 2025, issued to U.S. Appl. No. 18/092,585.

* cited by examiner

VEHICLE SUPPORT SYSTEM AND VEHICLE SUPPORT METHOD FOR MARKER RECOGNITION AND ILLUMINATION ADJUSTMENT

CROSS-REFERENCE TO RELATED APPLICATION

This application claims priority to Japanese Patent Application No. 2022-023295 filed on Feb. 17, 2022, the entire contents of which are incorporated by reference herein.

BACKGROUND

Technical Field

The present disclosure relates to a technique for supporting a moving body that recognizes a marker arranged in a predetermined area.

Background Art

Patent Literature 1 discloses a parking assist device mounted on a vehicle. The parking assist device automatically parks the vehicle in a target parking space. At this time, the parking assist device detects illuminance by using an in-vehicle illuminance sensor, and when the illuminance is equal to or less than a threshold, turns on an in-vehicle lighting device that illuminates the outside of the vehicle. Then, the parking assist device detects the target parking space based on an image captured in a state where the in-vehicle lighting device is turned on.

Patent Literature 2 discloses an autonomous travel monitoring device that autonomously travels on a predetermined route. The autonomous travel monitoring device includes an imaging means, a light means, and an illuminance detection means for detecting surrounding illuminance. At the time of imaging by the imaging means, the autonomous travel monitoring device automatically operates the light means according to the surrounding illuminance.

LIST OF RELATED ART

Patent Literature 1: Japanese Laid-Open Patent Application No. JP-2019-098911
Patent Literature 2: Japanese Laid-Open Patent Application No. JP-2006-031144

SUMMARY

A situation where a moving body recognizes a marker arranged in a predetermined area is considered. In a dark environment such as night-time and underground, it may be difficult for the moving body to recognize the marker. When a shadow falls on the marker, it may also be difficult for the moving body to recognize the marker. When the moving body cannot recognize the marker with high accuracy, accuracy of an operation of the moving body based on a result of marker recognition decreases.

An object of the present disclosure is to provide a technique capable of improving accuracy of marker recognition by a moving body.

A first aspect is directed to a moving body support system for supporting a moving body that recognizes a marker arranged in a predetermined area.

The moving body support system includes:
one or more memory devices configured to store marker position information indicating positions of a plurality of markers arranged in the predetermined area, and light position information indicating positions of one or more lights present in the predetermined area; and
one or more processors.

The one or more processors are configured to:
acquire, based on the marker position information, a position of a target marker being a target to be recognized by the moving body;
execute a brightness acquisition process that acquires information indicating brightness at the position of the target marker; and
when the brightness at the position of the target marker is less than a threshold, execute a light control process that selects, based on the light position information, a target light present at a position capable of illuminating the target marker and increases a light intensity of the target light as compared with a case where the brightness is equal to or greater than the threshold.

A second aspect is directed to a moving body support method for supporting a moving body that recognizes a marker arranged in a predetermined area.

The moving body support method includes:
acquiring marker position information indicating positions of a plurality of markers arranged in the predetermined area, and light position information indicating positions of one or more lights present in the predetermined area;
acquiring, based on the marker position information, a position of a target marker being a target to be recognized by the moving body;
executing a brightness acquisition process that acquires information indicating brightness at the position of the target marker; and
when the brightness at the position of the target marker is less than a threshold, executing a light control process that selects, based on the light position information, a target light present at a position capable of illuminating the target marker and increases a light intensity of the target light as compared with a case where the brightness is equal to or greater than the threshold.

According to the present disclosure, the brightness at the position of the target marker being the target to be recognized by the moving body is acquired. When the brightness at the position of the target marker is less than the threshold, the light intensity of the target light present at the position capable of illuminating the target marker is increased. As a result, the target marker becomes brighter and thus becomes easier for the moving body to recognize. That is, it is possible to improve accuracy of the marker recognition by the moving body. As a result, accuracy of an operation of the moving body based on a result of the marker recognition is also improved.

EMBODIMENTS

Embodiments of the present disclosure will be described with reference to the accompanying drawings.

1. First Embodiment

1-1. Overview

A case where a marker (landmark) M is arranged in a predetermined area AR and a moving body recognizes the marker M and operates will be considered. Examples of the moving body include a vehicle and a robot. The vehicle may be an autonomous driving vehicle. As an example, a case where the moving body is a vehicle will be considered in the following description. When generalizing, "vehicle" in the following description shall be deemed to be replaced with "moving body."

Figure 1:
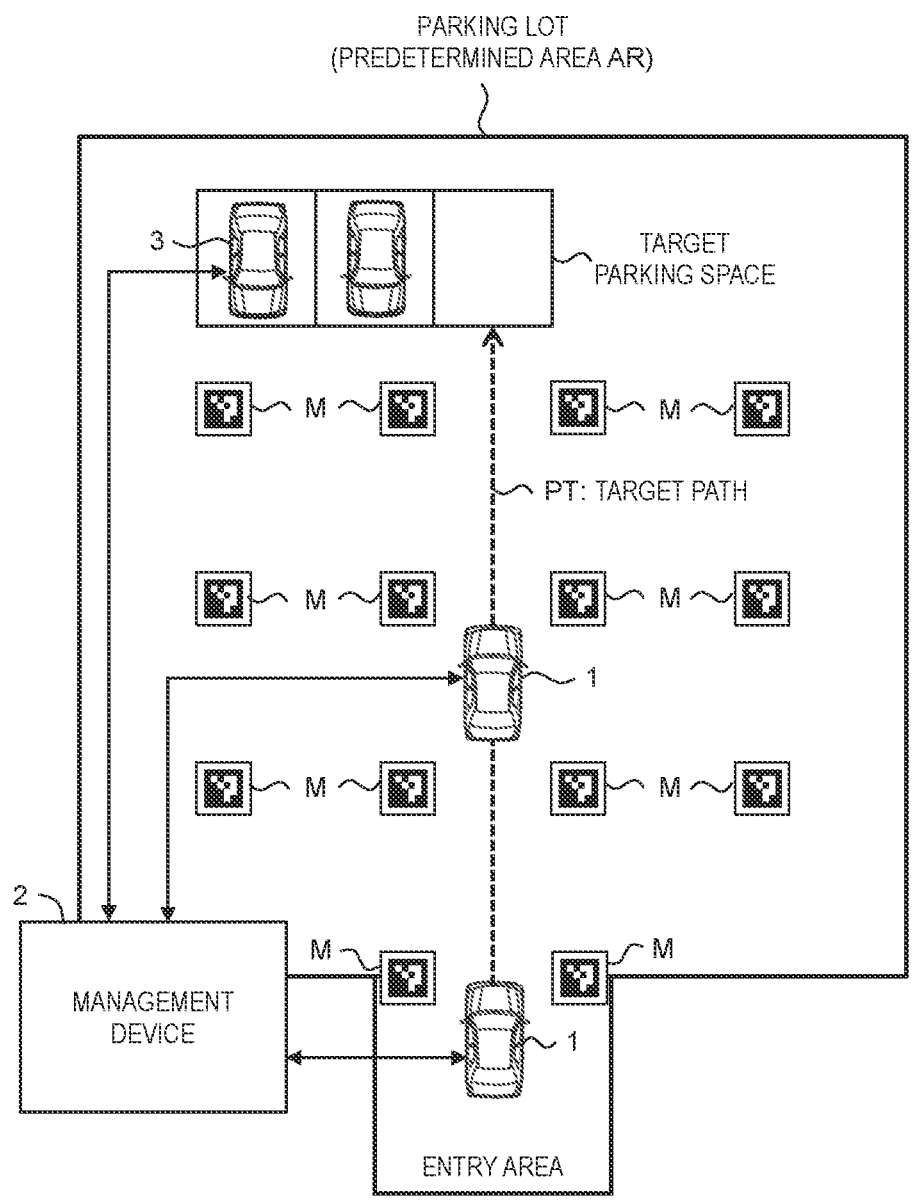
FIG. 1 is a conceptual diagram for explaining an overview of automated valet parking.

FIG. 1 is a conceptual diagram for explaining "automated valet parking (AVP)" as an example of a case where a vehicle 1 recognizes a marker M arranged in a predetermined area AR. In this example, the predetermined area AR is a parking lot. The parking lot may be indoor or may be outdoor. A plurality of markers M are arranged in the parking lot.

The vehicle 1 is an AVP vehicle that supports the automated valet parking in the parking lot, and is able to automatically travel at least in the parking lot. More specifically, the vehicle 1 is provided with a recognition sensor (e.g., a camera) for recognizing a surrounding situation. The vehicle 1 automatically travels in the parking lot while recognizing the surrounding situation by using the recognition sensor.

For example, the vehicle 1 uses a camera to acquire an image indicating a situation around the vehicle 1, and recognizes the marker M based on the image. The vehicle 1 is able to recognize an entry area based on a result of recognition of the marker M. Moreover, the vehicle 1 performs "localization process (self-position estimation process, localization)" that estimates a position of the vehicle 1 in the parking lot with high accuracy on the basis of the result of recognition of the marker M. More specifically, the vehicle 1 estimates its position with high accuracy by combining the result of recognition of the marker M based on the camera and position information (map information) of the markers M in the parking lot. A target path PT is a path of movement from the entry area to a target parking space allocated to the vehicle 1. Based on the position of the vehicle 1 estimated by the localization process and the target path PT, the vehicle 1 performs autonomous travel so as to follow the target path PT. This enables the vehicle 1 to automatically move from the entry area to the target parking space.

A management device 2 (management server) manages the automated valet parking in the parking lot. The management device 2 is capable of communicating with each vehicle (vehicle 1, parked vehicle 3) in the parking lot. For example, the management device 2 may issue an entry instruction or an exit instruction to the vehicle 1. The management device 2 may provide the vehicle 1 with position information (map information) of the markers M in the parking lot. The management device 2 may allocate a parking space to vehicle 1. The management device 2 may generate the target path PT from the entry area to the allocated parking space and provide the vehicle 1 with information on the target path PT. The management device 2 may grasp a position of each vehicle (vehicle 1, parked vehicle 3) in the parking lot. The management device 2 may remotely operate each vehicle (vehicle 1, parked vehicle 3) in the parking lot.

Figure 2:
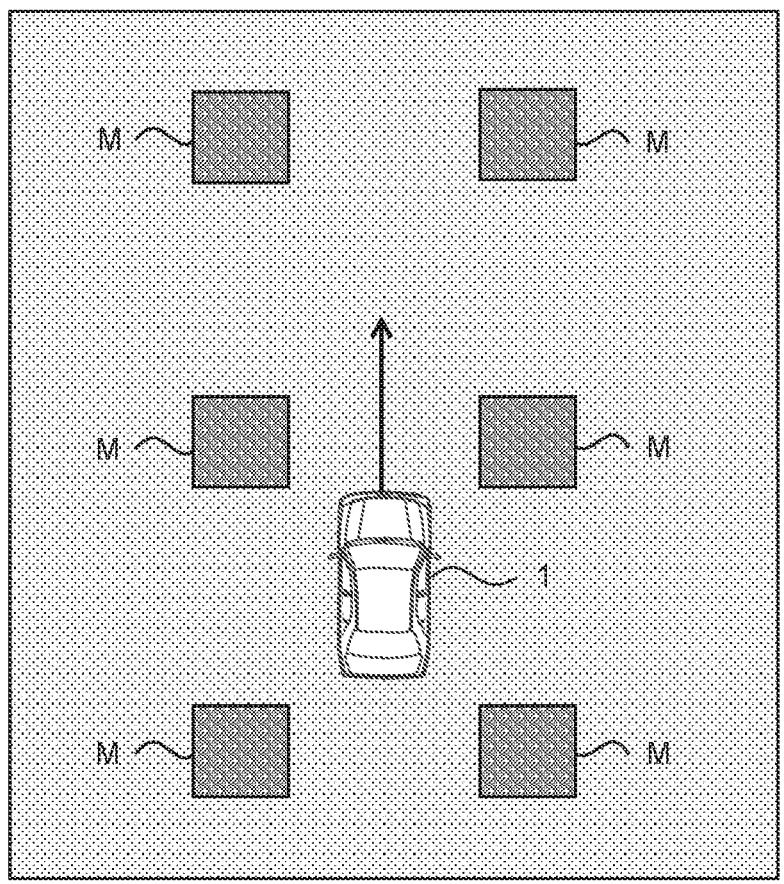
FIG. 2 is a conceptual diagram for explaining a problem.
Figure 3:
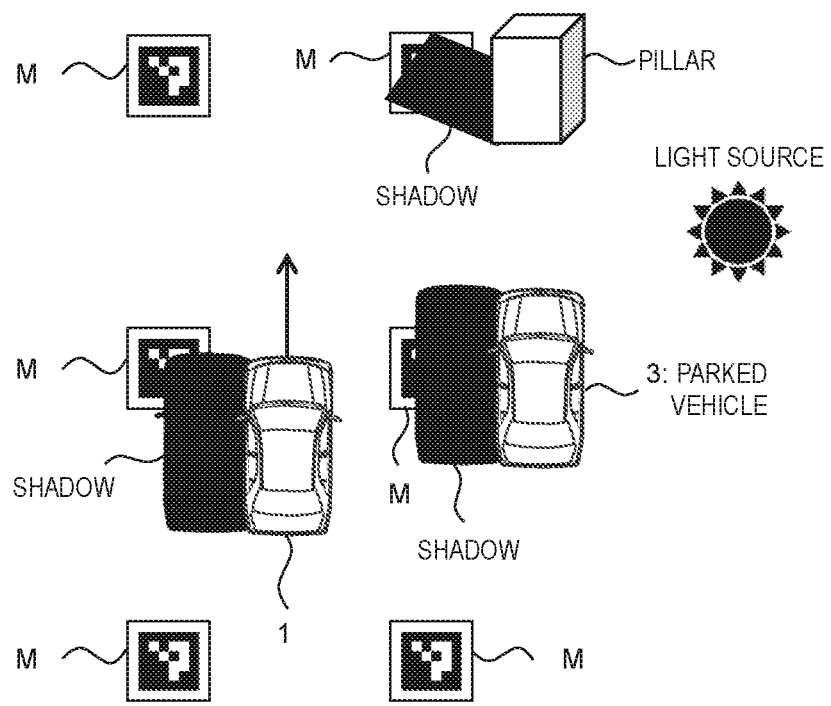
FIG. 3 is a conceptual diagram for explaining a problem.

FIGS. 2 and 3 are conceptual diagrams for explaining problems. As shown in FIG. 2, in a dark environment such as night-time and underground, it may be difficult for the vehicle 1 to recognize the marker M. That is, a marker recognition performance of the vehicle 1 is decreased. In addition, as shown in FIG. 3, a shadow may fall on the marker M depending on a positional relationship between a light source (for example, the sun, a light, and the like) and an object in the parking lot (for example, the vehicle 1, the parked vehicle 3, a pole, and the like). Also when the shadow falls on the marker M, it may be difficult for the vehicle 1 to recognize the marker M. When the vehicle 1 cannot recognize the marker M with high accuracy, accuracy of an operation of the vehicle 1 based on the result of the marker recognition decreases.

In view of the above, the first embodiment provides a technique capable of improving accuracy of the marker recognition by the vehicle 1 even in the situation exemplified in FIGS. 2 and 3.

Figure 4:
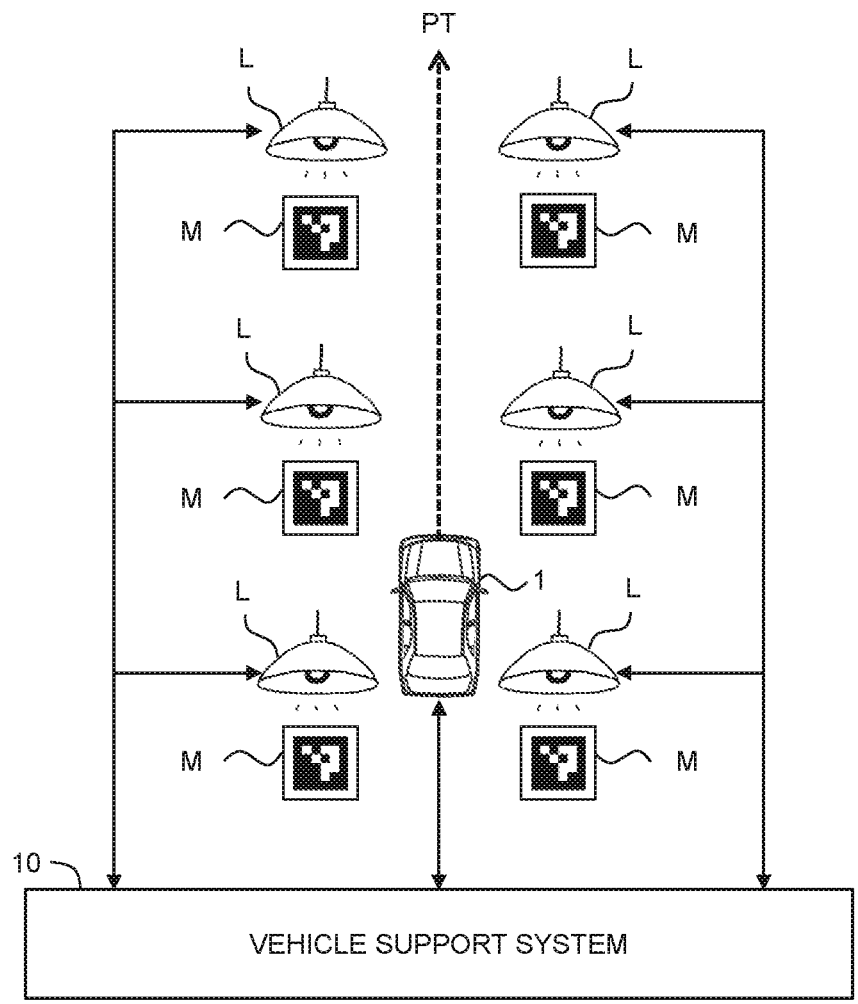
FIG. 4 is a conceptual diagram for explaining an overview of a vehicle support system according to a first embodiment.

FIG. 4 is a conceptual diagram for explaining an overview of a vehicle support system 10 that supports the vehicle 1 according to the present embodiment. One or more lights L are present in the predetermined area AR. The light L may be fixed or may be movable. The light L may be suspended from a ceiling or may be installed on a pole or the like. One light L may be provided for one marker M on a one-to-one basis, or one light L may be provided for a plurality of markers M.

The vehicle support system 10 is able to control a light intensity (light amount) of each light L present in the predetermined area AR. The vehicle support system 10 may ON/OFF control each light L. By controlling the light L present in the predetermined area AR, the vehicle support system 10 is able to support the vehicle 1 that recognizes the marker M arranged in the predetermined area AR.

More specifically, the vehicle support system 10 grasps a "target marker Mt" that is a target to be recognized by the vehicle 1, and acquires information indicating "brightness" at a position of the target marker Mt. When the brightness at the position of the target marker Mt is less than a threshold, the target marker Mt is dark and thus is difficult for the vehicle 1 to recognize. Therefore, the vehicle support system 10 selects a "target light Lt" that is present at a position capable of illuminating the target marker Mt from the one or more lights L. Then, the vehicle support system 10 increases the light intensity of the target light Lt as compared with a case where the brightness at the position of the target marker Mt is equal to or greater than the threshold. As a result, the target marker Mt becomes brighter and thus becomes easier for the vehicle 1 to recognize. That is, it is possible to improve the accuracy of the marker recognition by the vehicle 1.

The vehicle support system 10 may increase the light intensity of the target light Lt such that the brightness at the position of the target marker Mt becomes "target brightness." In this case, the vehicle support system 10 determines a control amount of the target light Lt based on a difference between the "current brightness" and the "target brightness" at the position of the target marker Mt. Securing the target brightness appropriate for the marker recognition makes it possible to further improve the accuracy of the marker recognition by the vehicle 1.

Figure 5:
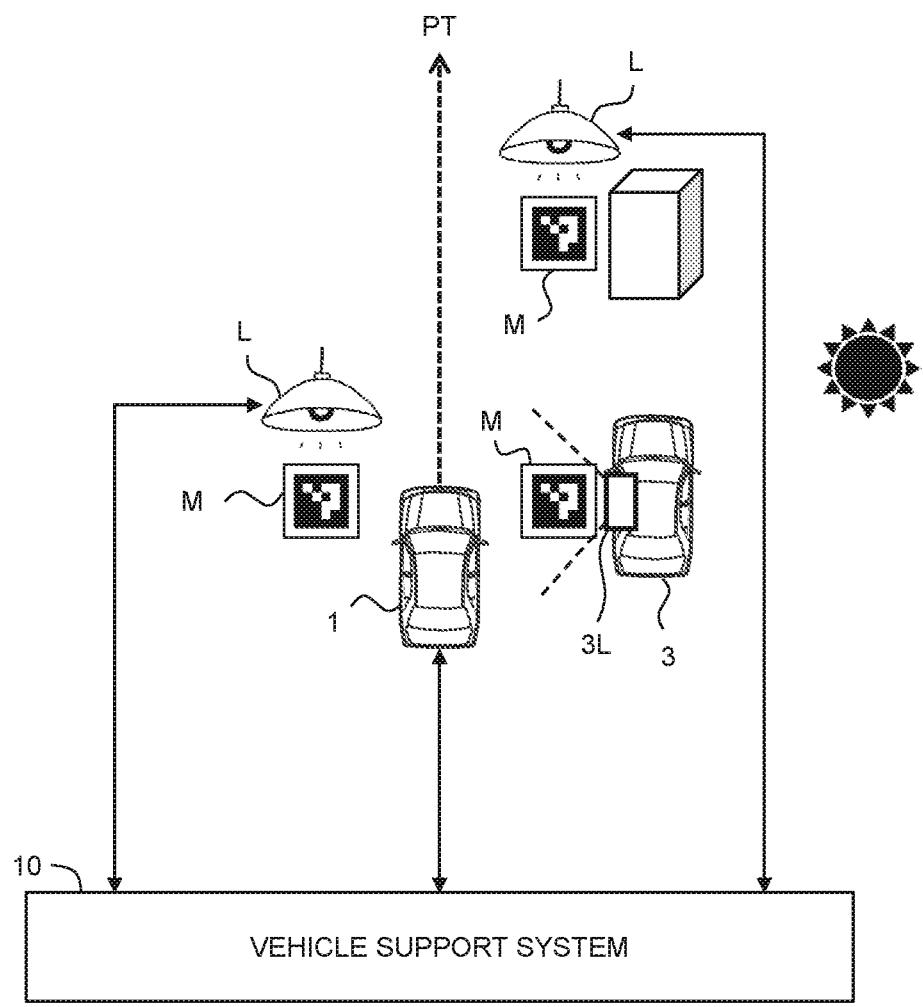
FIG. 5 is a conceptual diagram for explaining an overview of a vehicle support system according to the first embodiment.

FIG. 5 shows an example of the light control in a situation where shadows as shown in FIG. 3 occur. When a shadow falls on the target marker Mt, the brightness at the position of the target marker Mt becomes less than the threshold. The vehicle support system 10 increases the light intensity of the target light Lt that is present at the position capable of illuminating the target marker Mt. As a result, the target marker Mt becomes brighter and thus becomes easier for the vehicle 1 to recognize.

The parked vehicle 3 is provided with an external light 3L for illuminating the outside. Examples of the external light 3L include a welcome light, a headlight, and the like. As described above, the management device 2 that manages the automated valet parking in the parking lot is able to remotely operate the parked vehicle 3 in the parking lot. By utilizing such a remote operation function of the management device 2, the vehicle support system 10 can use the external light 3L of the parked vehicle 3 as one of the lights L. For example, as shown in FIG. 3, a shadow generated by the parked vehicle 3 and the light source may fall on the target marker Mt in the vicinity of the parked vehicle 3. In this case, as shown in FIG. 5, it is also possible to utilize the external light 3L of the parked vehicle 3 as the target light Lt. That is, by turning on the external light 3L of the parked vehicle 3, it is possible to make the target marker Mt in the vicinity of the parked vehicle 3 become brighter and thus become easier to recognize.

Hereinafter, the vehicle support system 10 according to the present embodiment will be described in more detail.

1-2. Configuration Example of Vehicle Support System

Figure 6:
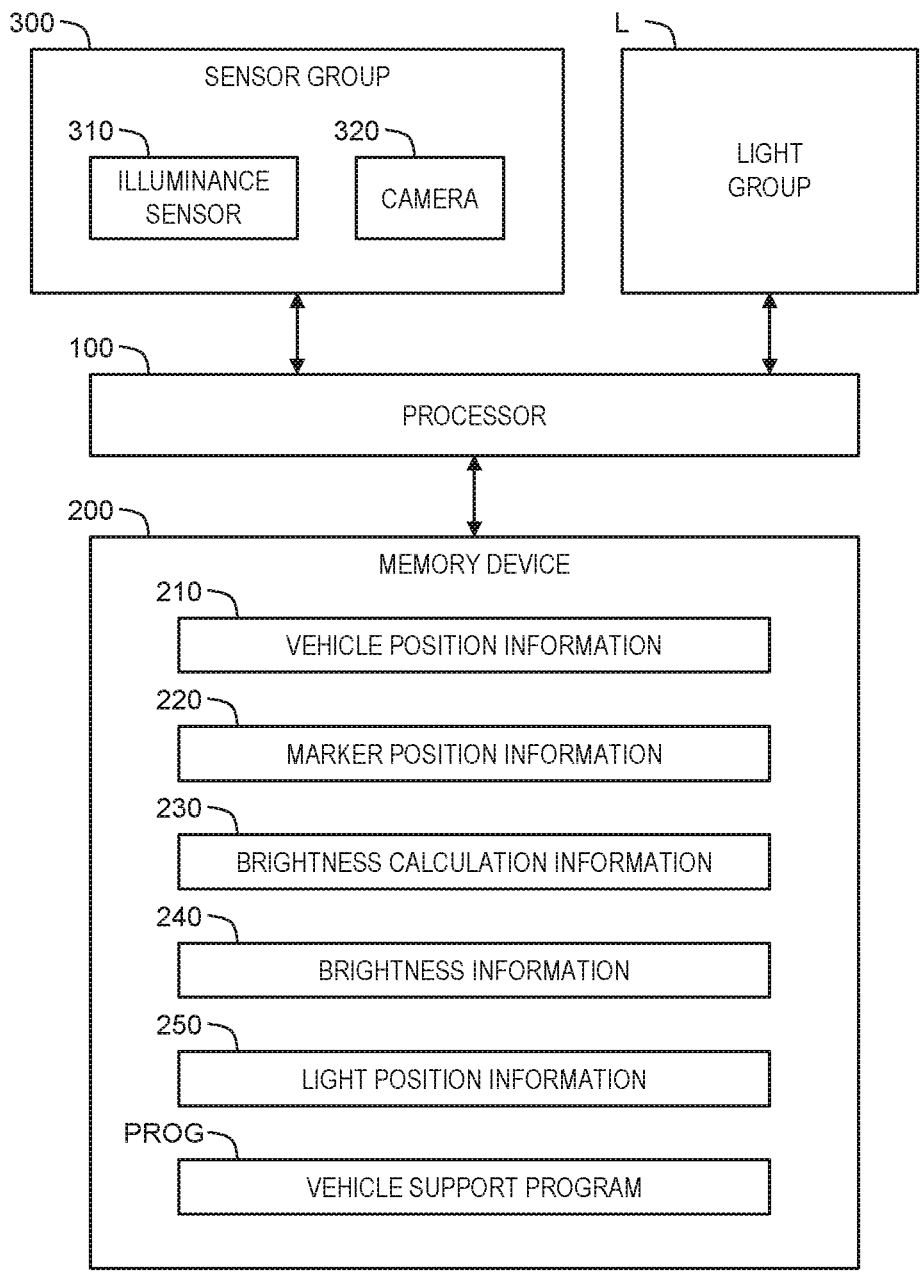
FIG. 6 is a block diagram showing a configuration example of a vehicle support system according to the first embodiment.

FIG. 6 is a block diagram showing a configuration example of the vehicle support system 10 according to the present embodiment. The vehicle support system 10 includes one or more processors 100 (hereinafter, simply referred to as a processor 100), one or more memory devices 200 (hereinafter, simply referred to as a memory device 200), a sensor group 300, and one or more lights L (hereinafter, simply referred to as a light L).

The processor 100 executes a variety of processing. For example, the processor 100 includes a central processing unit (CPU). The memory device 200 stores a variety of information necessary for the processing by the processor 100. Examples of the memory device 200 include a volatile memory, a nonvolatile memory, a hard disk drive (HDD), a solid state drive (SSD), and the like. At least a part of the processor 100 and the memory device 200 may be included in the management device 2 (see FIG. 1) that manages the automated valet parking in the parking lot. In other words, the vehicle support system 10 and the management device 2 may be at least partially the same. At least a part of the processor 100 and the memory device 200 may be included in the vehicle 1. In other words, the vehicle support system 10 and the vehicle 1 may be at least partially the same.

The sensor group 300 includes at least one of an illuminance sensor 310 and a camera 320. The illuminance sensor 310 includes at least one of an infrastructure illuminance sensor installed in the predetermined area AR and an in-vehicle illuminance sensor mounted on the vehicle 1. The camera 320 includes at least one of an infrastructure camera installed in the predetermined area AR and an in-vehicle camera mounted on the vehicle 1.

The light L is present in the predetermined area AR. Typically, the light L is installed in the predetermined area AR. The light L may include the external light 3L (e.g., a headlight, a welcome light) mounted on the parked vehicle 3 in the parking lot.

The processor 100 acquires a variety of information. The variety of information is stored in the memory device 200. For example, the variety of information includes vehicle position information 210, marker position information 220, brightness calculation information 230, brightness information 240, light position information 250, and the like.

The vehicle position information 210 indicates at least one of the position (current position) and the target path PT of the vehicle 1 in the predetermined area AR. An example of a method of acquiring the vehicle position information 210 will be described later.

The marker position information 220 indicates positions of the plurality of markers M arranged in the predetermined area AR. The marker position information 220 may be included in the map information of the predetermined area AR. The marker position information 220 is provided to the vehicle support system 10 from an administrator of the predetermined area AR or the like.

The brightness calculation information 230 is information used for calculating the brightness at the position of the target marker Mt. An example of the brightness calculation information 230 will be described later.

The brightness information 240 is information indicating the brightness at the position of the target marker Mt. An example of a method of acquiring the brightness information 240 will be described later.

The light position information 250 indicates positions of the lights L present in the predetermined area AR. The light position information 250 regarding the lights L installed in the predetermined area AR may be included in the map information of the predetermined area AR. The light position information 250 regarding the lights L installed in the predetermined area AR is provided to the vehicle support system 10 from an administrator of the predetermined area AR or the like. The light position information 250 regarding the external light 3L of the parked vehicle 3 is provided from the management device 2 that manages the automated valet parking to the vehicle support system 10.

A vehicle support program PROG is a computer program executed by the processor 100. The functions of the vehicle support system 10 (the processor 100) are realized by the processor 100 executing the vehicle support program PROG. The vehicle support program PROG is stored in the memory device 200. The vehicle support program PROG may be recorded on a non-transitory computer-readable recording medium.

Hereinafter, an example of a vehicle support process performed by the vehicle support system 10 (the processor 100) will be described in detail.

1-3. Example of Vehicle Support Process

Figure 7:
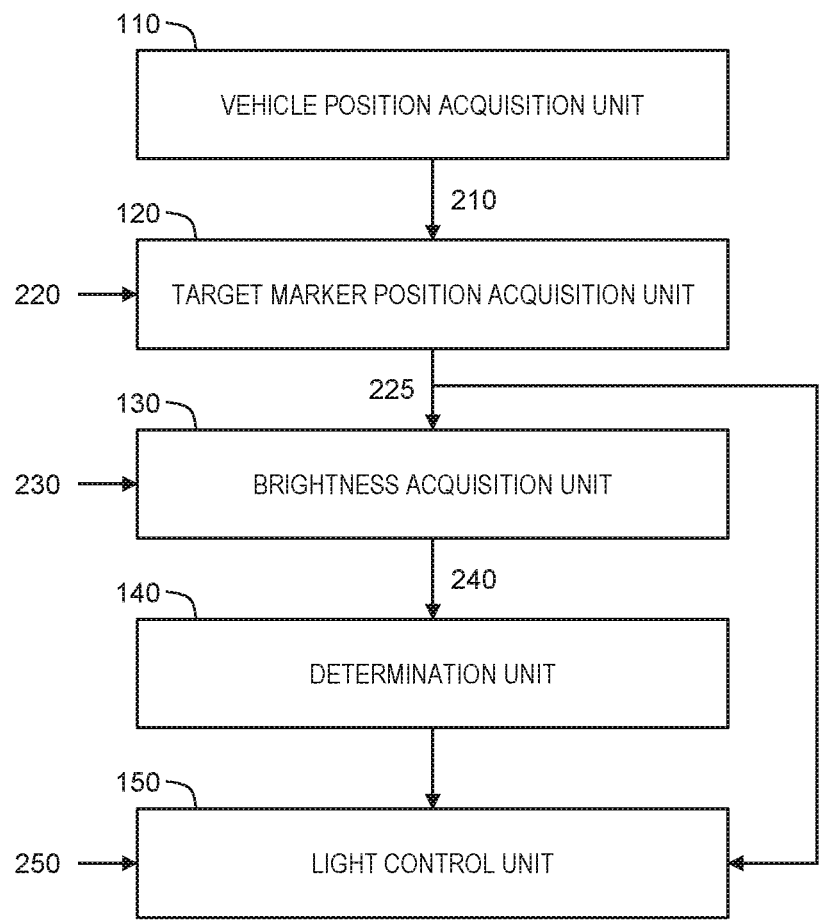
FIG. 7 is a block diagram showing a functional configuration example of a vehicle support system according to the first embodiment.

FIG. 7 is a block diagram showing a functional configuration example of the vehicle support system 10 according to the present embodiment. The vehicle support system 10 includes, as functional blocks, a vehicle position acquisition unit 110, a target marker position acquisition unit 120, a brightness acquisition unit 130, a determination unit 140, and a light control unit 150. These functional blocks are realized by cooperation between the processor 100 executing the vehicle support program PROG and the memory device 200.

Figure 8:
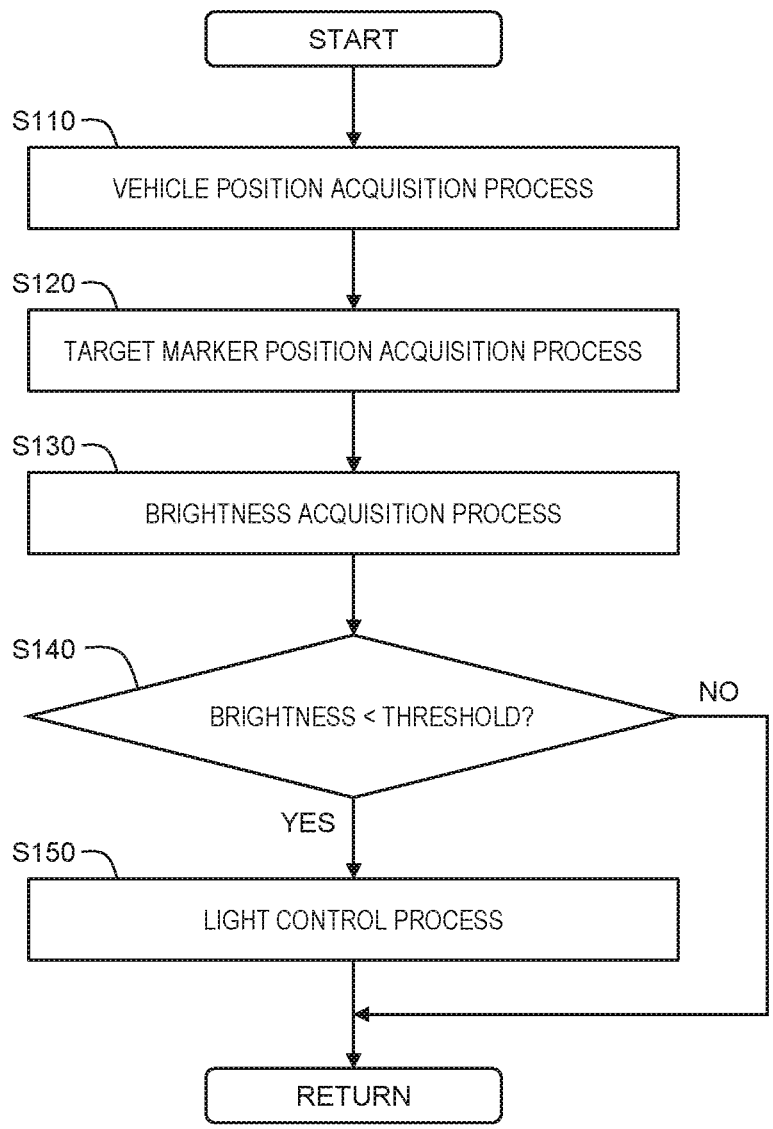
FIG. 8 is a flowchart showing a vehicle support process according to the first embodiment.

FIG. 8 is a flowchart showing the vehicle support process according to the present embodiment. The vehicle support process according to the present embodiment will be described with reference to FIGS. 7 and 8.

1-3-1. Vehicle Position Acquisition Process (Step S110)

In Step S110, the vehicle position acquisition unit 110 acquires the vehicle position information 210. The vehicle position information 210 indicates at least one of the position (current position) and the target path PT of the vehicle 1 in the predetermined area AR. The target path PT corresponds to a future position of the vehicle 1.

For example, the vehicle 1 performs a localization process based on a result of recognition of the marker M to estimate the position of the vehicle 1 with high accuracy. The vehicle position acquisition unit 110 communicates with the vehicle 1 and acquires the vehicle position information 210 indicating the position of the vehicle 1. Alternatively, the vehicle position acquisition unit 110 may be included in the vehicle 1.

As another example, the vehicle position acquisition unit 110 may capture an image of the vehicle 1 by using the camera 320 (the infrastructure camera) installed in the predetermined area AR to estimate the position of the vehicle 1.

The target path PT of the vehicle 1 in the predetermined area AR is determined for example by the management device 2 and provided to the vehicle 1. The vehicle position acquisition unit 110 can communicate with the management device 2 or the vehicle 1 to acquire the vehicle position information 210 indicating the target path PT. Alternatively, the vehicle position acquisition unit 110 may be included in the management device 2 or the vehicle 1.

1-3-2. Target Marker Position Acquisition Process (Step S120)

In Step S120, the target marker position acquisition unit 120 acquires the position of the target marker Mt which is a target to be recognized by the vehicle 1 using the camera.

For example, the target marker Mt is a marker M present in the vicinity of the current position of the vehicle 1. In this case, the target marker Mt is a marker M present within a certain range from the current position of the vehicle 1. The current position of the vehicle 1 is obtained from the vehicle position information 210. The position of each marker M is obtained from the marker position information 220. Therefore, the target marker position acquisition unit 120 can grasp the target marker Mt and acquire the position of the target marker Mt based on the vehicle position information 210 and the marker position information 220.

As another example, the target marker Mt may be a marker M scheduled to be recognized by the vehicle 1 in the future. That is, the target marker Mt may be a marker M present in the vicinity of the target path PT of the vehicle 1. In this case, the target marker Mt is a marker M present within a certain range from the target path PT of the vehicle 1. The target path PT of the vehicle 1 is obtained from the vehicle position information 210. The position of each marker M is obtained from the marker position information 220. Therefore, the target marker position acquisition unit 120 can grasp the target marker Mt and acquire the position of the target marker Mt based on the vehicle position information 210 and the marker position information 220.

Target marker position information 225 indicates the position of the target marker Mt acquired by the target marker position acquisition unit 120.

1-3-3. Brightness Acquisition Process (Step S130)

In Step S130, the brightness acquisition unit 130 acquires the brightness information 240 indicating the brightness at the position of the target marker Mt. The position of the target marker Mt is obtained from the target marker position information 225. The brightness calculation information 230 is information that is referred to for calculating (estimating) the brightness. Based on the target marker position information 225 and the brightness calculation information 230, the brightness acquisition unit 130 calculates the brightness at the position of the target marker Mt to acquire the brightness information 240.

Figure 9:
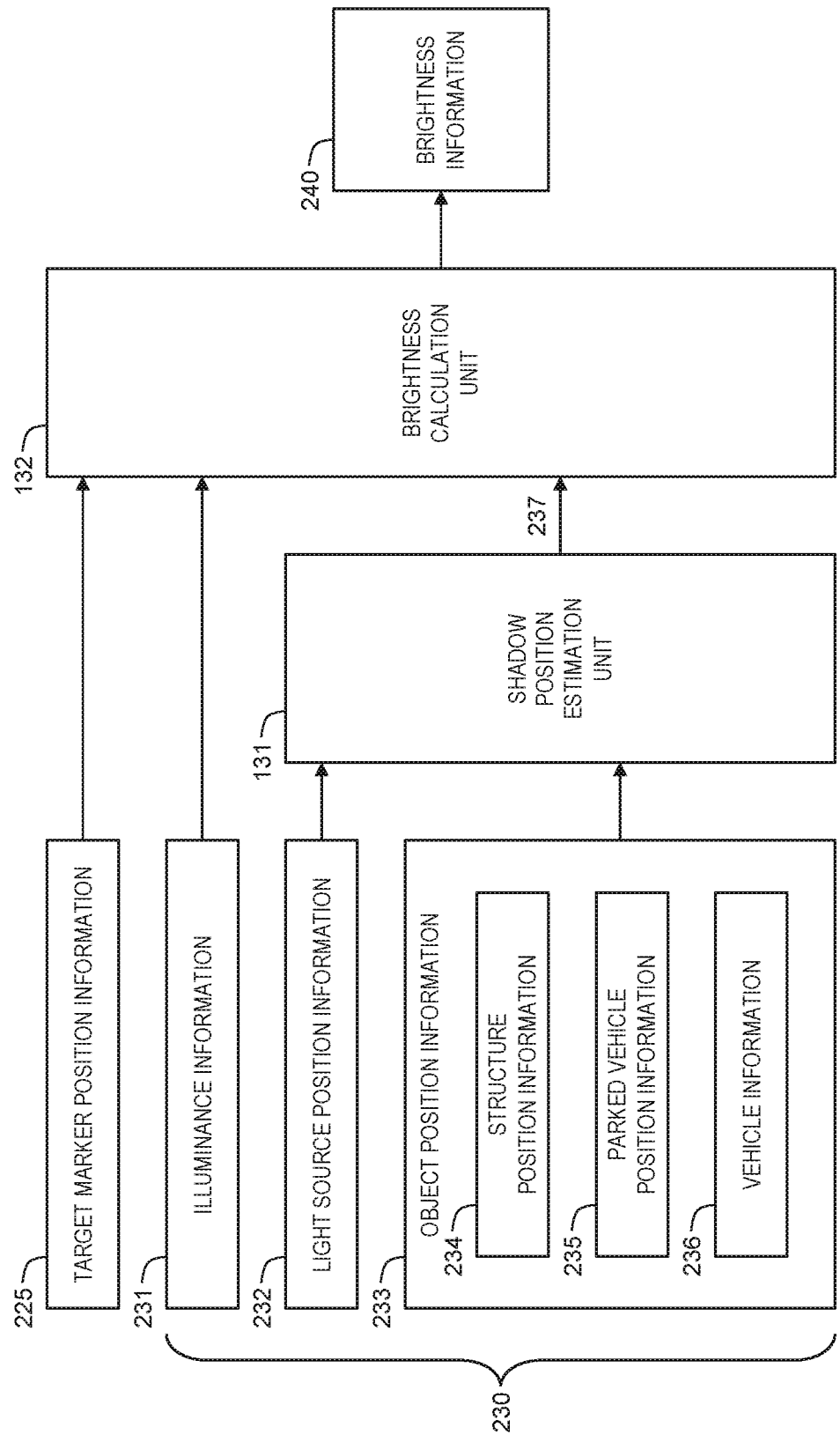
FIG. 9 is a block diagram for explaining an example of brightness acquisition process according to the first embodiment.

FIG. 9 is a block diagram for explaining an example of the brightness acquisition process performed by the brightness acquisition unit 130. The brightness acquisition unit 130 includes a shadow position estimation unit 131 and a brightness calculation unit 132. The brightness calculation information 230 includes illuminance information 231, light source position information 232, and object position information 233.

The illuminance information 231 indicates at least one of illuminance around the vehicle 1 and illuminance in the predetermined area AR. For example, the illuminance is detected by the illuminance sensor 310. The illuminance sensor 310 includes at least one of an infrastructure illuminance sensor installed in the predetermined area AR and an in-vehicle illuminance sensor mounted on the vehicle 1. As another example, the illuminance may be calculated (estimated) based on luminance of an image captured by the camera 320. The camera 320 includes at least one of an infrastructure camera installed in the predetermined area AR and an in-vehicle camera mounted on the vehicle 1. As still another example, the illuminance may be estimated based on the time of day (i.e., position of the sun) and weather information.

The light source position information 232 indicates a position of a light source. Examples of the light source include the sun, the light L installed in the predetermined area AR, and the like. The position of the sun can be calculated based on the season and the time of day. The position of the light L is obtained from the light position information 250.

The object position information 233 indicates a position of an object in the predetermined area AR. For example, the object position information 233 includes structure position information 234, parked vehicle position information 235, and vehicle information 236.

The structure position information 234 indicates a position of a structure in the predetermined area AR. Examples of the structure include a column and a wall. The structure position information 234 may be included in the map information of the predetermined area AR. The structure position information 234 is provided to the vehicle support system 10 from an administrator of the predetermined area AR or the like.

The parked vehicle position information 235 indicates a position of the parked vehicle 3 in the predetermined area AR (parking lot). The parked vehicle position information 235 is provided from the management device 2 to the vehicle support system 10.

The vehicle information 236 indicates the position (current position) of the vehicle 1 in the predetermined area AR. The position of the vehicle 1 is obtained from the vehicle position information 210. The vehicle information 236 may further indicate a size (length, width, height) of the vehicle 1. The size information of the vehicle 1 is provided from the vehicle 1.

The shadow position estimation unit 131 estimates a position of a shadow generated by the light source and the object in the predetermined area AR. The position of the light source is obtained from the light source position information 232. The position of the object in the predetermined area AR is obtained from the object position information 233. Therefore, the shadow position estimation unit 131 is able to estimate the position of the shadow based on the light source position information 232 and the object position information 233. Shadow position information 237 is information indicating the estimated shadow position.

The brightness calculation unit 132 calculates (estimates) the brightness at the position of the target marker Mt. The position of the target marker Mt is obtained from the target marker position information 225. The illuminance information 231 indicates at least one of the illuminance around the vehicle 1 and the illuminance in the predetermined area AR. The shadow position information 237 indicates the position of the shadow in the predetermined area AR. Therefore, the brightness calculation unit 132 is able to calculate (estimate) the brightness at the position of the target marker Mt based on the target marker position information 225, the illuminance information 231, and the shadow position information 237. The brightness calculation unit 132 may use only one of the illuminance information 231 and the shadow position information 237.

The brightness information 240 indicates the brightness at the position of the target marker Mt calculated by the brightness calculation unit 132.

1-3-4. Determination Process (Step S140)

In Step S140, the determination unit 140 determines, based on the brightness information 240, whether or not the brightness at the position of the target marker Mt is less than a threshold. This determination process is performed for each target marker Mt. When the brightness at the position of a target marker Mt is less than the threshold (Step S140; Yes), the processing regarding the target marker Mt proceeds to Step S150. On the other hand, when the brightness at the position of a target marker Mt is equal to or greater than the threshold (Step S140; No), the processing regarding the target marker Mt in the current cycle ends.

1-3-5. Light Control Process (Step S150)

In Step S150, the light control unit 150 performs a light control process that controls the one or more lights L present in the predetermined area AR.

More specifically, the light control unit 150 selects a light L present at a position capable of illuminating the target marker Mt as a target light Lt. The position of the target marker Mt is obtained from the target marker position information 225. The position of each light L present in the predetermined area AR is obtained from the light position information 250. It is assumed that an irradiation range of each light L is known information. Based on the target marker position information 225 and the light position information 250, the light control unit 150 can select the target light Lt present at a position capable of illuminating the target marker Mt.

Further, the light control unit 150 increases the light intensity of the target light Lt as compared with the case where the brightness at the position of the target marker Mt is equal to or greater than the threshold. As a result, the target marker Mt becomes brighter and thus becomes easier for the vehicle 1 to recognize. That is, it is possible to improve the accuracy of the marker recognition by the vehicle 1.

The light control unit 150 may increase the light intensity of the target light Lt such that the brightness at the position of the target marker Mt becomes "target brightness." In this case, the light control unit 150 determines a control amount of the target light Lt based on a difference between the "current brightness" and the "target brightness" at the position of the target marker Mt. Securing the target brightness appropriate for the marker recognition makes it possible to further improve the accuracy of the marker recognition by the vehicle 1.

1-4. Processing Regarding Recognized Marker

Figure 10:
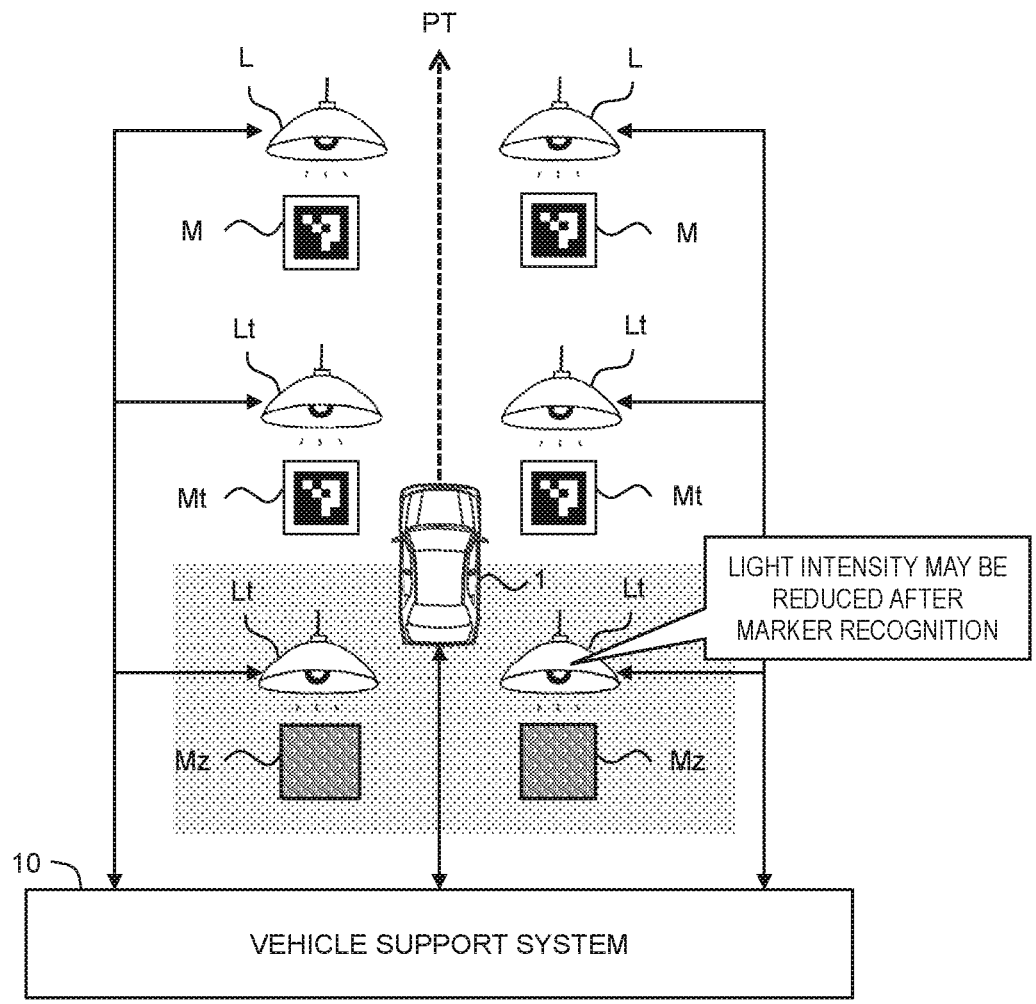
FIG. 10 is a conceptual diagram for explaining an example of processing by a vehicle support system according to the first embodiment.

FIG. 10 is a conceptual diagram for explaining processing related to a recognized marker Mz. The recognized marker Mz is the target marker Mt that is already recognized by the vehicle 1. When recognizing the target marker Mt, the vehicle 1 notifies the vehicle support system 10 of identification information or the position of the recognized marker Mz. In response to the notification, the processor 100 may reduce the light intensity of the target light Lt that has illuminated the recognized marker Mz. In other words, the processor 100 may reduce the light intensity of the target light Lt illuminating the recognized marker Mz as compared with that before the recognition of the recognized marker Mz. The processor 100 may turn off the target light Lt that has illuminated the recognized marker Mz. This makes it possible to suppress an unnecessary increase in power consumption.

1-5. Effects

As described above, according to the present embodiment, the vehicle support system 10 acquires the brightness at the position of the target marker Mt being the target to be recognized by the vehicle 1. When the brightness at the position of the target marker Mt is less than the threshold, the vehicle support system 10 selects the target light Lt present at the position capable of illuminating the target marker Mt and increases the light intensity of the target light Lt. As a result, the target marker Mt becomes brighter and thus becomes easier for the vehicle 1 to recognize. That is, it is possible to improve the accuracy of the marker recognition by the vehicle 1.

The vehicle support system 10 may increase the light intensity of the target light Lt such that the brightness at the position of the target marker Mt becomes the "target brightness." This makes it possible to secure the target brightness appropriate for the marker recognition and to further improve the accuracy of the marker recognition by the vehicle 1.

Since the accuracy of the marker recognition by the vehicle 1 is improved, accuracy of an operation of the vehicle 1 based on a result of the marker recognition is also improved.

It should be noted that an external light mounted on the vehicle 1 itself may be used as the light L. However, an irradiation range of the external light mounted on the vehicle 1 is limited. Therefore, using the light L installed in the parking lot is able to more appropriately make the target marker Mt brighter.

2. Second Embodiment 2-1. Overview

In the first embodiment described above, the light control for the target marker Mt that is the target to be recognized by the vehicle 1 has been described. In a second embodiment, light control for a marker M other than the target marker Mt will be considered as well. A description overlapping with the first embodiment will be omitted as appropriate.

As described above, the accuracy of recognition of the target marker Mt can be improved by increasing the light intensity of the target light Lt at the position capable of illuminating the target marker Mt. Here, there is no need to make the marker M other than the target marker Mt brighter. The reason is that the marker M other than the target marker Mt is irrelevant to the operation of the vehicle 1. Making the marker M irrelevant to the operation of the vehicle 1 brighter leads to an unnecessary increase in power consumption. In view of the above, according to the second embodiment, the vehicle support system 10 (the processor 100) actively weakens a light intensity of a light L at a position illuminating the marker M far from the vehicle 1. In other words, the vehicle support system 10 balances the light intensities of the plurality of lights L in the predetermined area AR in consideration of a positional relationship between the vehicle 1 and the marker M.

Figure 11:
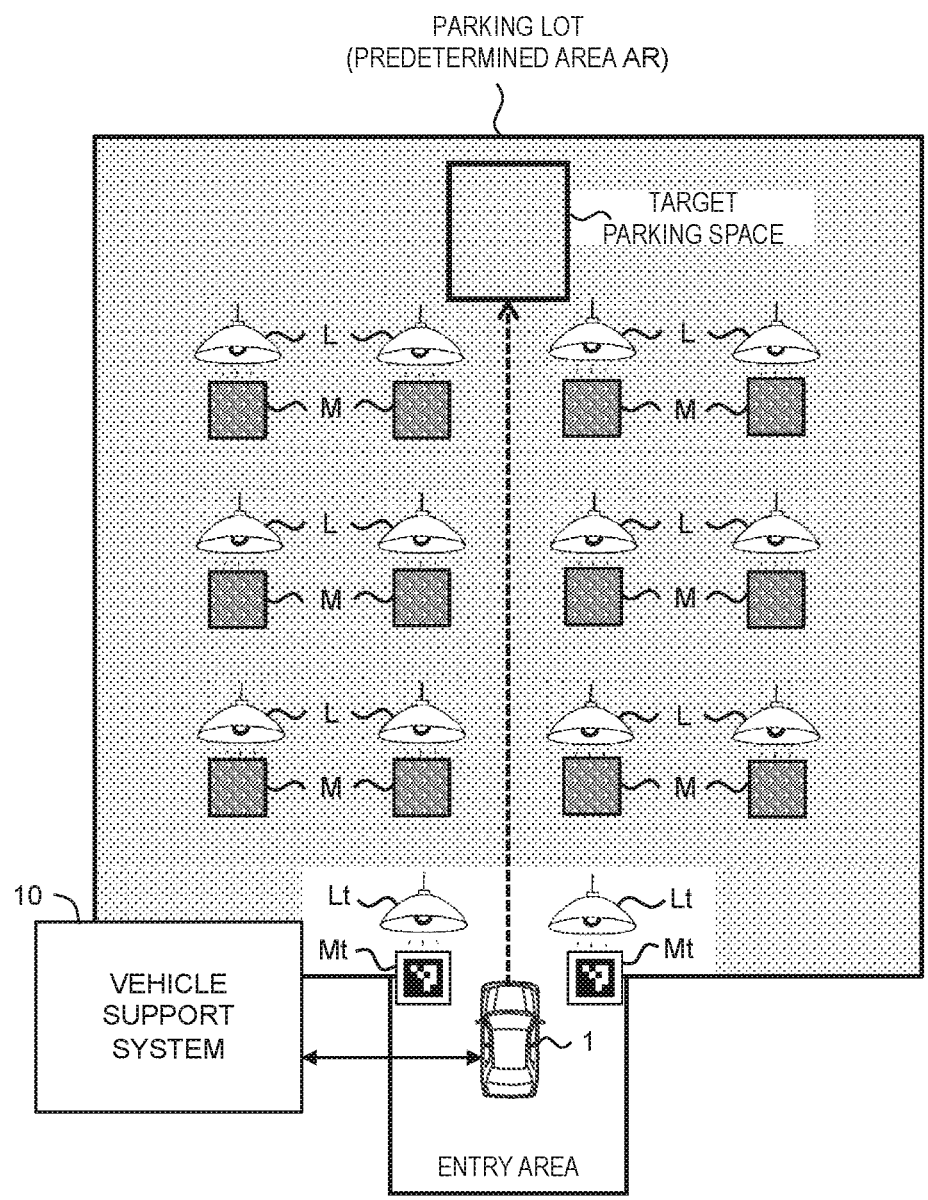
FIG. 11 is a conceptual diagram for explaining an example of processing by a vehicle support system according to a second embodiment.
Figure 12:
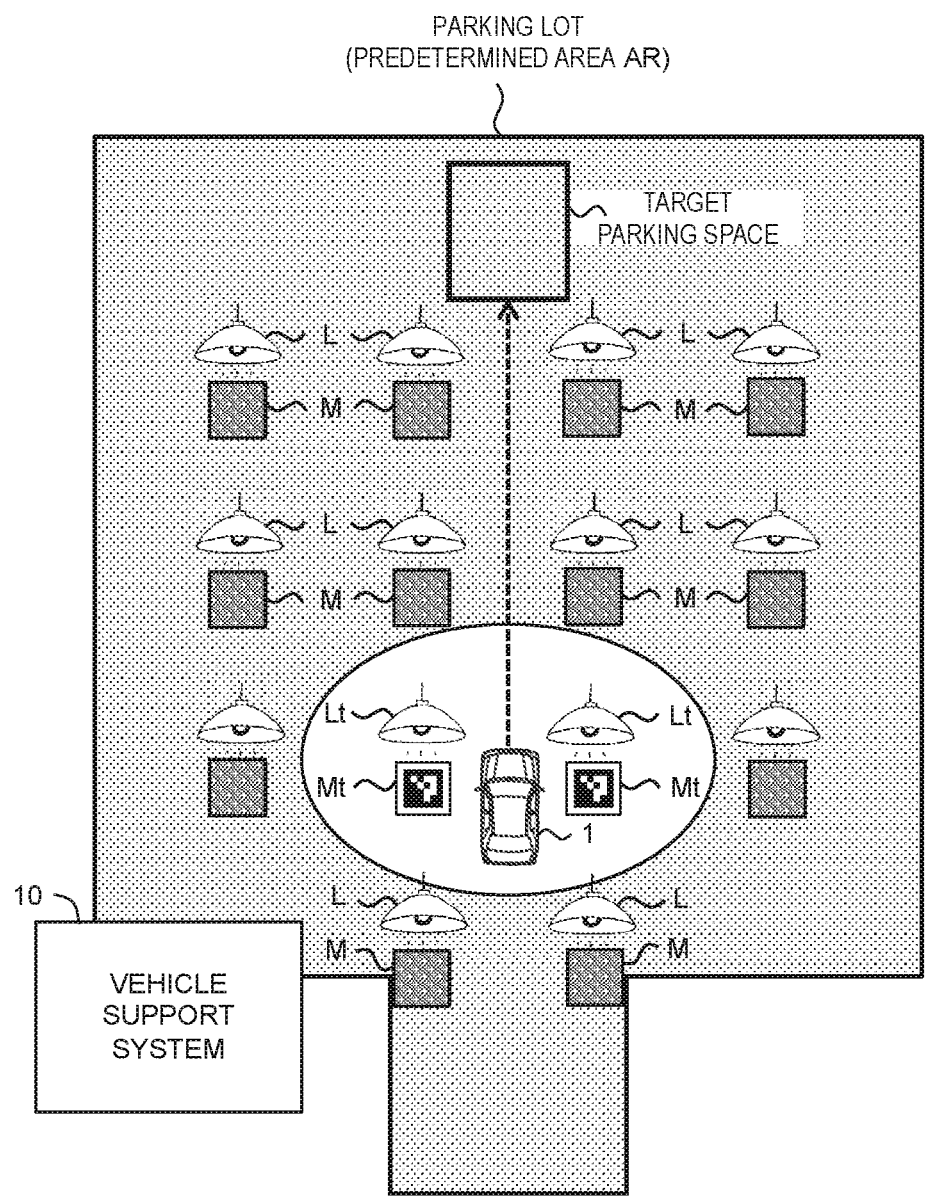
FIG. 12 is a conceptual diagram for explaining an example of processing by a vehicle support system according to the second embodiment.
Figure 13:
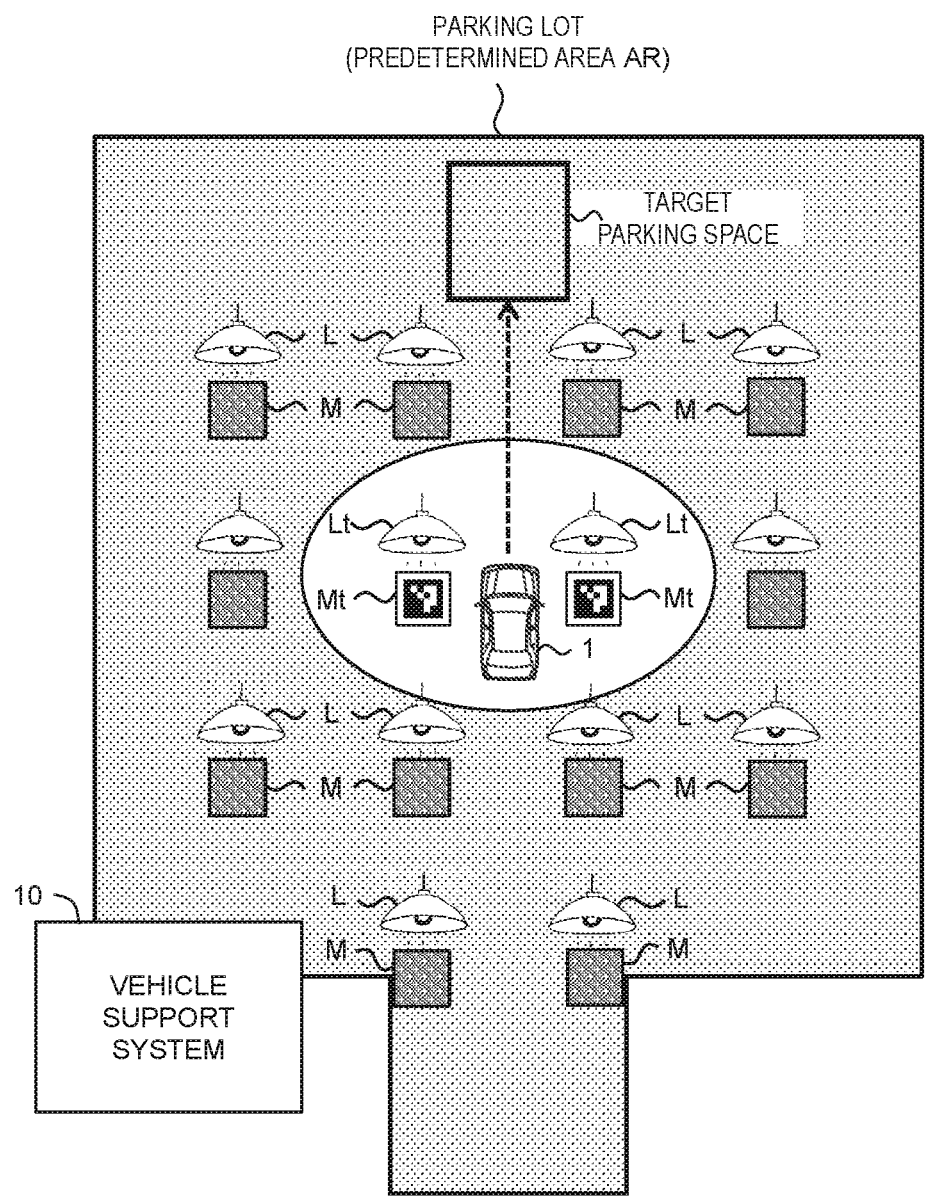
FIG. 13 is a conceptual diagram for explaining an example of processing by a vehicle support system according to the second embodiment.

FIGS. 11 to 13 are conceptual diagrams for explaining an example of processing by the vehicle support system 10 according to the second embodiment. In the example shown in FIGS. 11 to 13, the target marker Mt is a marker M in the vicinity of the position (current position) of the vehicle 1. Markers M other than the target marker Mt are farther from the position of the vehicle 1 than the target marker Mt is. The vehicle support system 10 controls the plurality of lights L in the predetermined area AR such that illuminance of the marker M other than the target marker Mt becomes lower than the illuminance of the target marker Mt. As a result, the power consumption in the predetermined area AR as a whole is suppressed.

In the example shown in FIGS. 11 to 13, a bright region also moves following movement of the vehicle 1. That is, the vehicle support system 10 controls the plurality of lights L in the predetermined area AR as if a spotlight is casted on the vehicle 1 and the spotlight moves following the movement of the vehicle 1. In this case, the light intensity of the target light Lt illuminating the recognized marker Mz is reduced as compared with that before the recognition of the recognized marker Mz, as in the case shown in FIG. 10.

Figure 14:
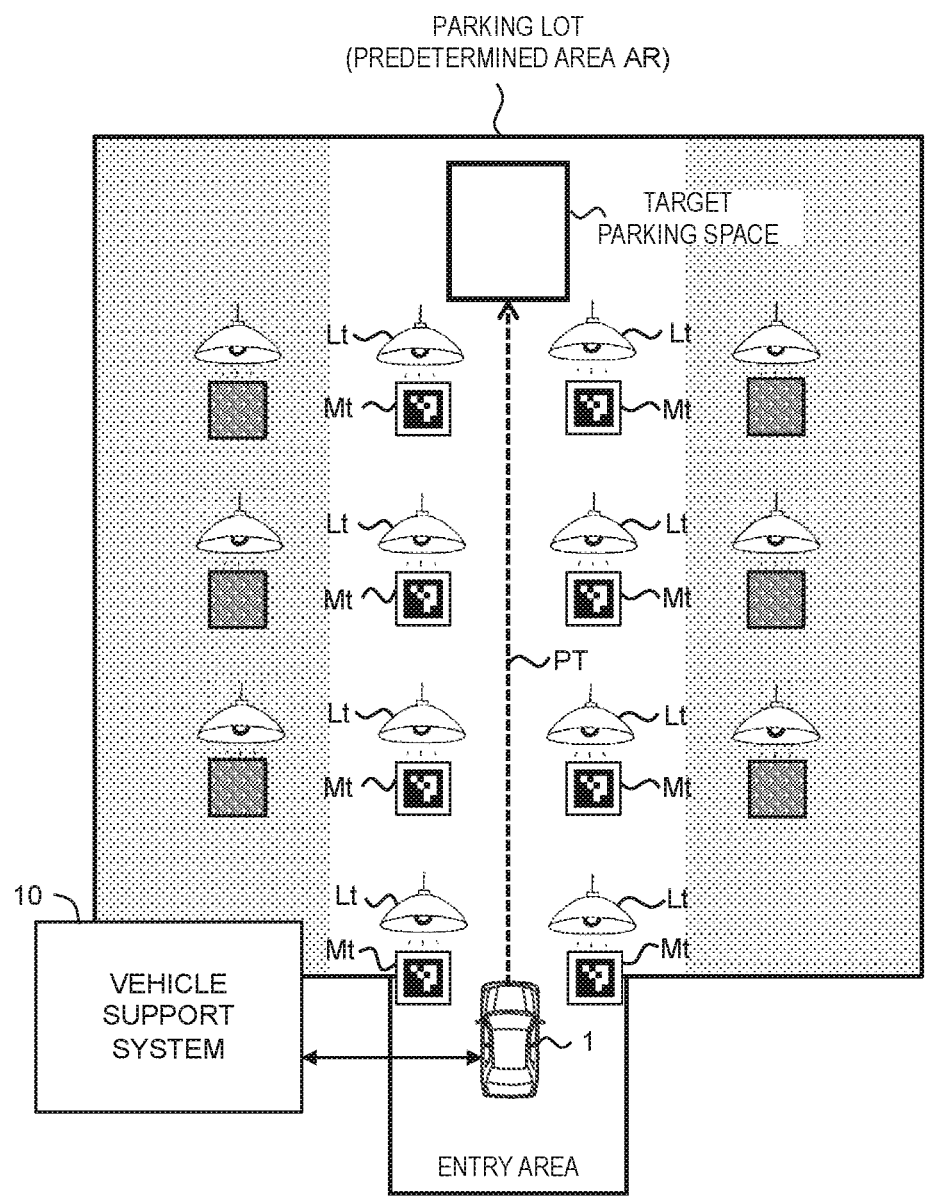
FIG. 14 is a conceptual diagram for explaining another example of processing by a vehicle support system according to the second embodiment.

FIG. 14 is a conceptual diagram for explaining another example of processing by the vehicle support system 10 according to the second embodiment. In the example shown in FIG. 14, the target marker Mt is a marker M in the vicinity of the target path PT of the vehicle 1. Markers M other than the target marker Mt are farther from the target path of the vehicle 1 than the target marker Mt is. The vehicle support system 10 controls the plurality of lights L in the predetermined area AR such that illuminance of the marker M other than the target marker Mt becomes lower than the illuminance of the target marker Mt. As a result, the power consumption in the predetermined area AR as a whole is suppressed.

Figure 15:
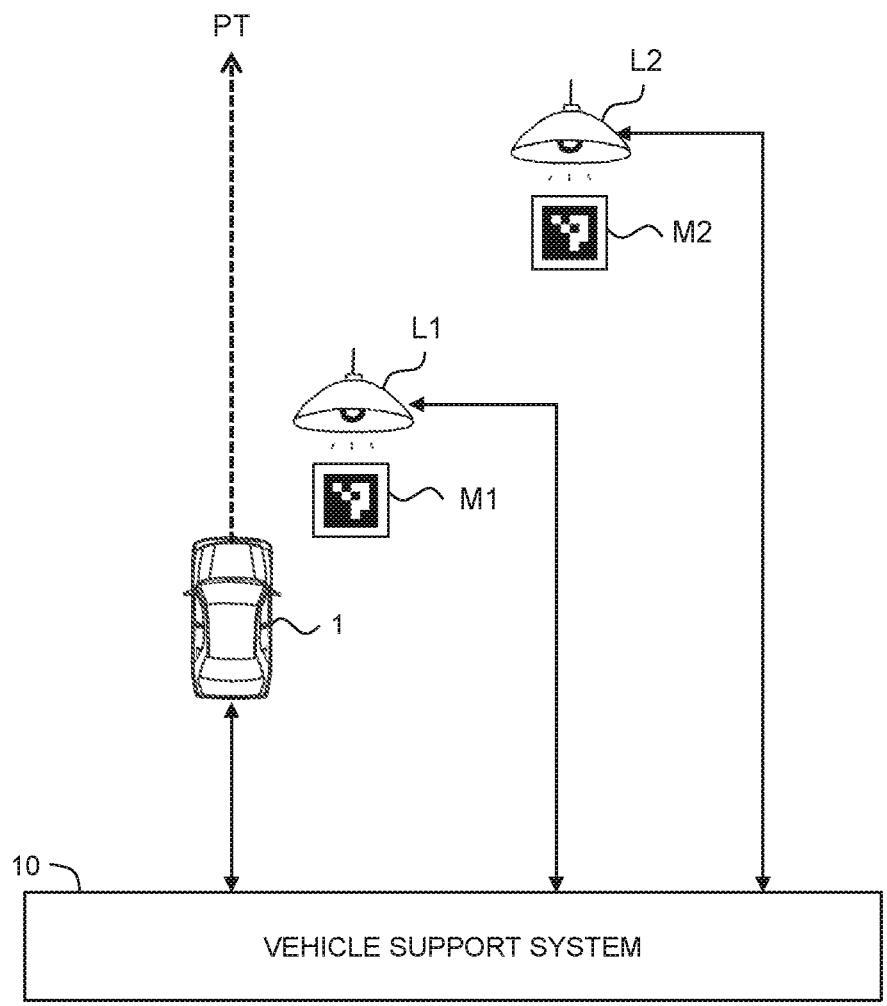
FIG. 15 is a conceptual diagram for explaining an overview of processing by a vehicle support system according to the second embodiment.

FIG. 15 is a conceptual diagram for explaining an overview of the processing by the vehicle support system 10 according to the second embodiment. A first marker M1 is at least included in the target marker Mt. A second marker M2 is farther from the position (current position) or the target path PT of the vehicle 1 than the first marker M1 is. In other words, the second marker M2 is farther than the first marker M1 when viewed from the position (current position) or the target path PT of the vehicle 1. The second marker M2 may be a target marker Mt that is farther than the first marker M1. The vehicle support system 10 (the processor 100) controls the plurality of lights L in the predetermined area AR such that illuminance of the second marker M2 becomes lower than illuminance of the first marker M1.

More specifically, the plurality of lights in the predetermined area AR include a first light L1 present at a position capable of illuminating the first marker M1 and a second light L2 present at a position capable of illuminating the second marker M2. The vehicle support system 10 (the processor 100) sets a light intensity of the second light L2 to be lower than a light intensity of the first light L1. As a result, the power consumption in the predetermined area AR as a whole is suppressed. The vehicle support system 10 (the processor 100) may turn on the first light L1 and turn off the second light L2. Turning off the second light L2 makes it possible to further suppress the power consumption.

2-2. Configuration Example of Vehicle Support System

The vehicle support system 10 according to the second embodiment also has a configuration similar to that shown in FIG. 6.

Figure 16:
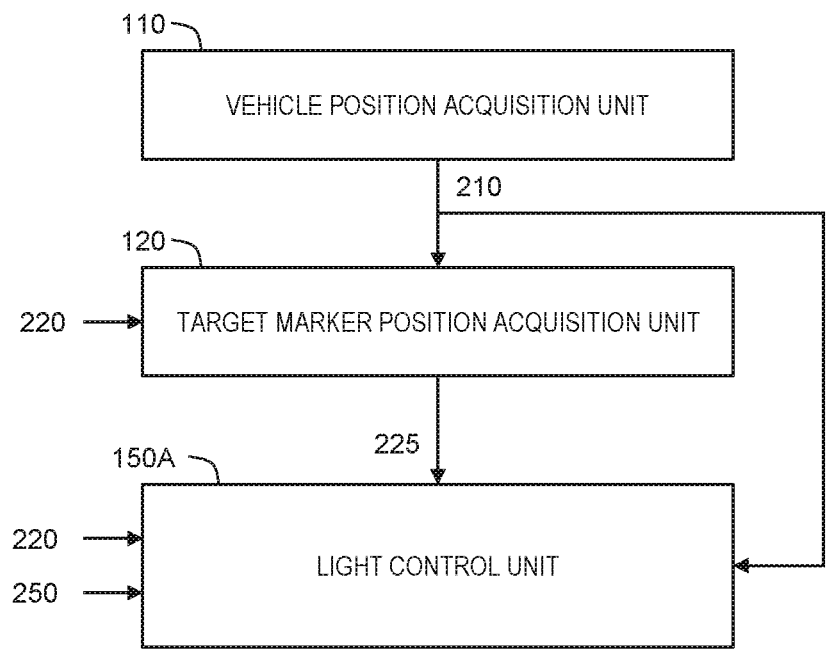
FIG. 16 is a block diagram showing a functional configuration example of a vehicle support system according to the second embodiment.

FIG. 16 is a block diagram showing a functional configuration example of the vehicle support system 10 according to the second embodiment. The vehicle support system 10 includes, as functional blocks, the vehicle position acquisition unit 110, the target marker position acquisition unit 120, and a light control unit 150A. The vehicle position acquisition unit 110 and the target marker position acquisition unit 120 are the same as those in the case of the first embodiment.

In Step S150 (the light control process), the light control unit 150A controls the plurality of lights L present in the predetermined area AR. The first marker M1 is at least included in the target marker Mt. The second marker M2 is farther from the position (current position) or the target path PT of the vehicle 1 than the first marker M1 is. The light control unit 150A can recognize the first marker M1 and the second marker M2 on the basis of the vehicle position information 210, the marker position information 220, and the target marker position information 225. Therefore, the light control unit 150A can control the plurality of lights L such that the illuminance of the second marker M2 becomes lower than the illuminance of the first marker M1, based on the vehicle position information 210, the marker position information 220, the target marker position information 225, and the light position information 250. More specifically, the light control unit 150A sets the light intensity of the second light L2 present at the position illuminating the second marker M2 to be lower than the light intensity of the first light L1 present at the position illuminating the first marker M1. The light control unit 150A may turn on the first light L1 and turn off the second light L2.

2-3. Effects

According to the second embodiment, it is possible to suppress the power consumption in the predetermined area AR as a whole while improving the accuracy of the marker recognition by the vehicle 1.

2-4. Combination with First Embodiment

A combination of the first embodiment and the second embodiment is also possible. In this case, the light control unit 150 according to the first embodiment shown in FIG. 7 also has the function of the light control unit 150A according to the second embodiment shown in FIG. 16.

3. Third Embodiment 3-1. Overview

A third embodiment is a modification example of the second embodiment. A description overlapping with the foregoing embodiments will be omitted as appropriate.

Figure 17:
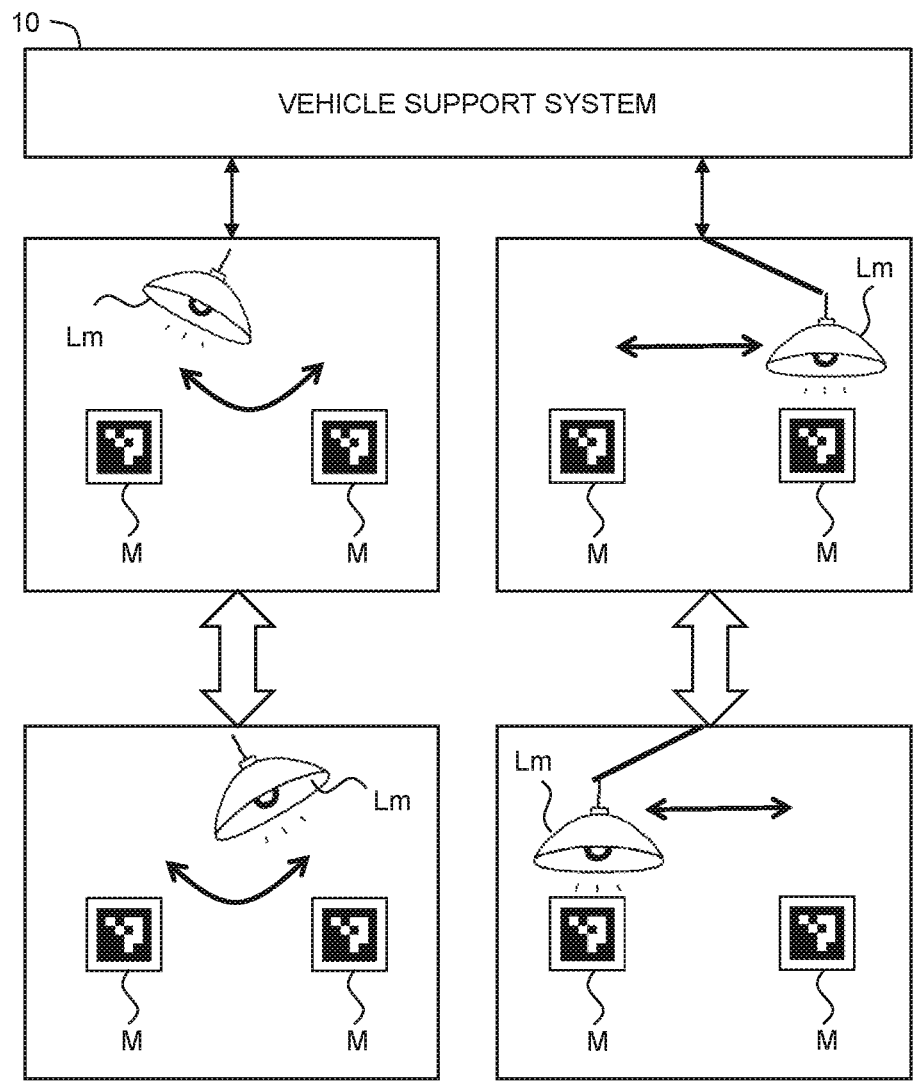
FIG. 17 is a conceptual diagram for explaining a movable light according to a third embodiment.

FIG. 17 is a conceptual diagram for explaining a movable light Lm used in the third embodiment. The one or more lights L installed in the predetermined area AR include one or more movable lights Lm. At least one of a position and an orientation of the movable light Lm is variable. The vehicle support system 10 (the processor 100) is able to change at least one of the position and the orientation of the movable light Lm.

Figure 18:
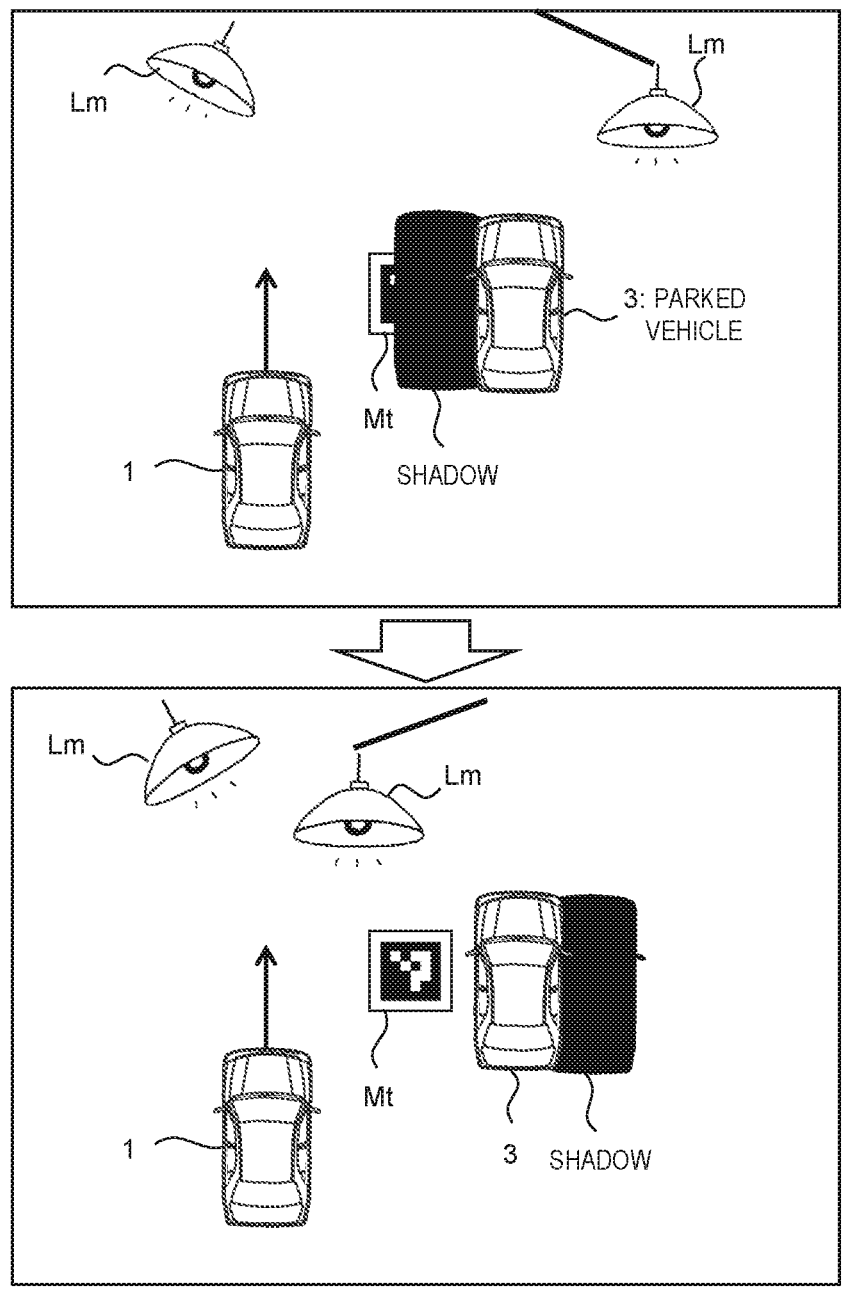
FIG. 18 is a conceptual diagram for explaining an example of processing by a vehicle support system according to the third embodiment.

FIG. 18 is a conceptual diagram for explaining an example of processing by the vehicle support system 10 according to the third embodiment. The vehicle support system 10 (the processor 100) controls at least one of the position and the orientation of the movable light Lm such that the target marker Mt becomes brighter. As a result, the marker M other than the target marker Mt becomes relatively dark. That is, the vehicle support system 10 (the processor 100) controls at least one of the position and the orientation of the movable light Lm such that the illuminance of the target marker Mt becomes higher than illuminance of the marker M other than the target marker Mt.

Figure 19:
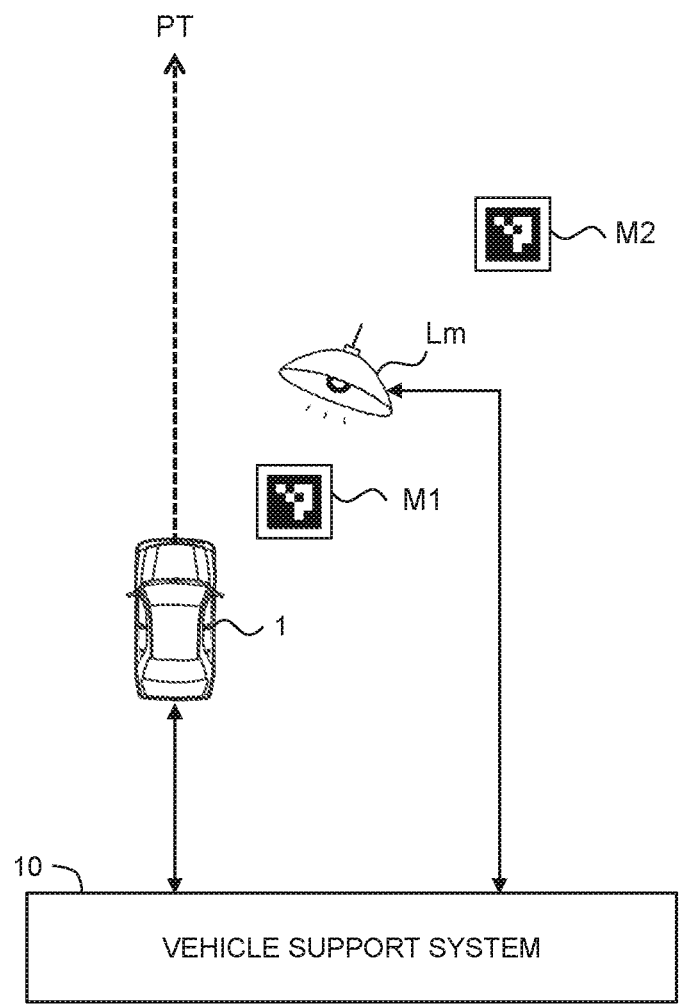
FIG. 19 is a conceptual diagram for explaining an overview of processing by a vehicle support system according to the third embodiment.

The brightness control as described in the above FIGS. 11 to 13 is also possible. That is, the vehicle support system 10 (the processor 100) may control at least one of the position and the orientation of the movable light Lm such that an area illuminated by the movable light Lm moves and follows the vehicle 1. Also in this case, the light intensity of the target light Lt illuminating the recognized marker Mz is reduced as compared with that before the recognition of the recognized marker Mz, as in the case shown in FIG. 10, FIG. 19 is a conceptual diagram for explaining an overview of the processing by the vehicle support system 10 according to the third embodiment. A first marker M1 is at least included in the target marker Mt. A second marker M2 is farther from the position (current position) or the target path PT of the vehicle 1 than the first marker M1 is. In other words, the second marker M2 is farther than the first marker M1 when viewed from the position (current position) or the target path PT of the vehicle 1. The second marker M2 may be a target marker Mt that is farther than the first marker M1. The vehicle support system 10 (the processor 100) controls at least one of the position and the orientation of movable light Lm such that illuminance of first marker M1 becomes higher than illuminance of second marker M2.

3-2. Configuration Example of Vehicle Support System

The vehicle support system 10 according to the third embodiment also has a configuration similar to that shown in FIG. 6.

Figure 20:
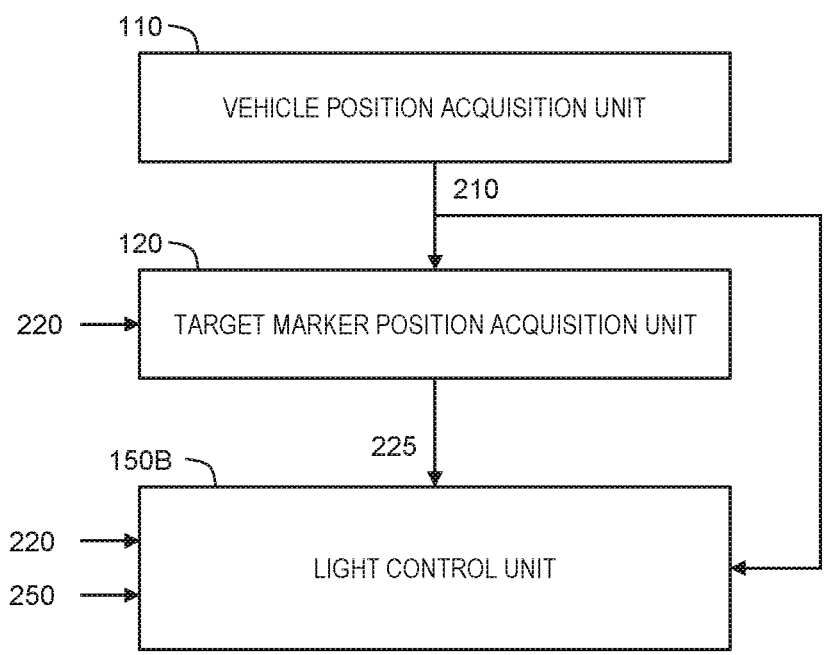
FIG. 20 is a block diagram showing a functional configuration example of a vehicle support system according to the third embodiment.

FIG. 20 is a block diagram showing a functional configuration example of the vehicle support system 10 according to the third embodiment. The vehicle support system 10 includes, as functional blocks, the vehicle position acquisition unit 110, the target marker position acquisition unit 120, and a light control unit 150B. The vehicle position acquisition unit 110 and the target marker position acquisition unit 120 are the same as those in the case of the first embodiment.

In Step S150 (light control process), the light control unit 150B controls the movable light Lm present in the predetermined area AR. The first marker M1 is at least included in the target marker Mt. The second marker M2 is farther from the position (current position) or the target path PT of the vehicle 1 than the first marker M1 is. The light control unit 150B can recognize the first marker M1 and the second marker M2 on the basis of the vehicle position information 210, the marker position information 220, and the target marker position information 225. Therefore, the light control unit 150B can control at least one of the position and the orientation of the movable light Lm such that the illuminance of the first marker M1 becomes higher than the illuminance of the second marker M2, based on the vehicle position information 210, the marker position information 220, the target marker position information 225, and the light position information 250.

3-3. Effects

According to the third embodiment, it is possible to reduce a total number of the lights L to be installed in the predetermined area AR by utilizing the movable light Lm whose at least one of the position and the orientation is variable. In addition, the number of lights L to be simultaneously turned on can be reduced. This contributes to reduction in costs and the power consumption. That is, according to the third embodiment, it is possible to reduce the costs and power consumption while improving the accuracy of the marker recognition by the vehicle 1.

3-4. Combination with First Embodiment

A combination of the first embodiment and the third embodiment is also possible. In this case, the light control unit 150 according to the first embodiment shown in FIG. 7 also has the function of the light control unit 150B according to the third embodiment shown in FIG. 20.

4. Fourth Embodiment

The present disclosure is also applicable to other than the automated valet parking of the vehicle 1 in the parking lot. For example, the present disclosure is also applicable to automated valet parking in which an autonomous travel robot tows a vehicle not having an autonomous travel function. In addition, the present disclosure is also applicable to a case where the markers M are arranged in a city and a mobility such as a vehicle and a robot recognizes the marker M to perform the localization process.

When generalizing, "vehicle" in the above description shall be deemed to be replaced with "moving body." That is, a "moving body support system" supports the moving body that recognizes the marker M arranged in the predetermined area AR.

What is claimed is:

1. A moving body support system for supporting a moving body including a vehicle that recognizes a marker arranged in a predetermined area, the moving body support system comprising:
one or more memories configured to store marker position information indicating positions of a plurality of markers arranged in the predetermined area, and light position information indicating positions of one or more lights present in the predetermined area; and
one or more processors configured to:
acquire, based on the marker position information, a position of a target marker being a target to be recognized by the moving body;
execute a brightness acquisition process that acquires information indicating brightness at the position of the target marker;
when the brightness at the position of the target marker is less than a threshold, execute a light control process that selects, based on the light position information, a target light present at a position capable of illuminating the target marker and increases a light intensity of the target light as compared with a case where the brightness is equal to or greater than the threshold;
acquire moving body position information indicating at least one of a position and a target path of the moving body in the predetermined area; and
acquire the position of the target marker based on the marker position information and the moving body position information, wherein:
the plurality of markers include:
a first marker included in the target marker; and
a second marker farther from the position or the target path of the moving body than the first marker is,
the light control process includes controlling the one or more lights such that illuminance of the second marker becomes lower than illuminance of the first marker based on the marker position information, the light position information, and the moving body position information,
the one or more processors are further configured to:
determine a light intensity of the target light based on a difference between a current brightness and the target brightness at the position of the target marker;
receive a notification of a recognized target marker, the notification including identification information or a position of the recognized marker; and
reduce, in response to the notification, the light intensity of the target light that has illuminated the recognized marker, and
the target marker is the marker scheduled to be recognized by the vehicle in the future based on a target path position.

2. The moving body support system according to claim 1, wherein the light control process includes increasing the light intensity of the target light such that the brightness at the position of the target marker becomes target brightness.

3. The moving body support system according to claim 1, wherein the one or more lights include:
a first light present at a position capable of illuminating the first marker; and
a second light present at a position capable of illuminating the second marker, and
the light control process includes setting a light intensity of the second light to be lower than a light intensity of the first light.

4. The moving body support system according to claim 3, wherein the light control process includes turning on the first light and turning off the second light.

5. The moving body support system according to claim 1, wherein the one or more lights include a movable light whose at least one of a position and an orientation is variable, and
the light control process includes controlling the at least one of the position and the orientation of the movable light such that the illuminance of the first marker becomes higher than the illuminance of the second marker.

6. The moving body support system according to claim 5, wherein
the light control process includes controlling the at least one of the position and the orientation of the movable light such that an area illuminated by the movable light moves and follows the moving body.

7. The moving body support system according to claim 1, wherein
a recognized marker is the target marker that is already recognized by the moving body, and
the one or more processors are further configured to reduce a light intensity of the target light illuminating the recognized marker as compared with before recognition of the recognized marker.

8. The moving body support system according to claim 1, wherein the brightness acquisition process includes:
acquiring at least one of illuminance around the moving body and illuminance in the predetermined area; and
acquiring the brightness at the position of the target marker based on the position of the target marker and the illuminance acquired.

9. The moving body support system according to claim 1, wherein the brightness acquisition process includes:
a shadow position estimation process that estimates a position of a shadow in the predetermined area; and
acquiring the brightness at the position of the target marker based on the position of the target marker and the position of the shadow.

10. The moving body support system according to claim 9, wherein the shadow position estimation process includes:
acquiring light source position information indicating a position of a light source;
acquiring object position information indicating a position of an object in the predetermined area; and
estimating, based on the light source position information and the object position information, the position of the shadow generated by the light source and the object.

11. The moving body support system according to claim 1, wherein
the predetermined area is a parking lot, and
the moving body supports automated valet parking in the parking lot.

12. The moving body support system according to claim 11, wherein
the one or more processors are capable of remotely operating a parked vehicle in the parking lot, and
the one or more lights include an external light of the parked vehicle.

13. A moving body support method for supporting a moving body including a vehicle that recognizes a marker arranged in a predetermined area, the moving body support method comprising:

acquiring marker position information indicating positions of a plurality of markers arranged in the predetermined area, and light position information indicating positions of one or more lights present in the predetermined area;

acquiring, based on the marker position information, a position of a target marker being a target to be recognized by the moving body;

executing a brightness acquisition process that acquires information indicating brightness at the position of the target marker;

when the brightness at the position of the target marker is less than a threshold, executing a light control process that selects, based on the light position information, a target light present at a position capable of illuminating the target marker and increases a light intensity of the target light as compared with a case where the brightness is equal to or greater than the threshold;

acquiring moving body position information indicating at least one of a position and a target path of the moving body in the predetermined area; and acquiring the position of the target marker based on the marker position information and the moving body position information, wherein:

the plurality of markers include:
a first marker included in the target marker; and
a second marker farther from the position or the target path of the moving body than the first marker is, the light control process includes controlling the one or more lights such that illuminance of the second marker becomes lower than illuminance of the first marker based on the marker position information, the light position information, and the moving body position information, the moving body support method further comprising:
determine a light intensity of the target light based on a difference between a current brightness and the target brightness at the position of the target marker;
receiving a notification of a recognized target marker, the notification including identification information or a position of the recognized marker; and
reducing, in response to the notification, the light intensity of the target light that has illuminated the recognized marker, and the target marker is the marker scheduled to be recognized by the vehicle in the future based on a target path position.

\* \* \* \* \*